United States Patent
Budka et al.

(10) Patent No.: US 7,577,227 B2
(45) Date of Patent: *Aug. 18, 2009

(54) LINK ADAPTION IN GENERAL PACKET RADIO SERVICE NETWORKS

(75) Inventors: Kenneth C. Budka, Marlboro, NJ (US); Arnab Das, Old Bridge, NJ (US); Wei Luo, Highland Park, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1490 days.

This patent is subject to a terminal disclaimer.

(21) Appl. No.: 10/124,298

(22) Filed: Apr. 18, 2002

(65) Prior Publication Data

US 2003/0198312 A1    Oct. 23, 2003

(51) Int. Cl.
H04L 23/00 (2006.01)
(52) U.S. Cl. .............. 375/377; 375/227; 375/228; 375/316; 455/68; 455/69; 455/522; 370/252
(58) Field of Classification Search ............... 375/259, 375/227–228, 346, 224, 225, 219, 220, 221, 375/222, 261, 377, 316, 295, 146; 455/510, 455/423, 450, 67.1, 67.3, 63, 63.1, 522, 68–69, 455/65, 452.2; 370/252, 347, 445, 335, 342, 370/465, 329, 231, 232, 441, 229, 468, 235, 370/332, 437, 318; 714/704, 706
See application file for complete search history.

(56) References Cited

U.S. PATENT DOCUMENTS 5,701,294 A * 12/1997 Ward et al. ............ 370/252
5,822,315 A * 10/1998 de Seze et al. ........... 370/337
5,835,507 A * 11/1998 Huang et al. ............ 714/748
5,909,469 A *  6/1999 Frodigh et al. .......... 375/302
6,134,230 A * 10/2000 Olofsson et al. ......... 370/337
6,330,288 B1   12/2001 Budka et al.
6,393,276 B1 *  5/2002 Vanghi ................ 455/422.1
6,542,742 B2 *  4/2003 Schramm et al. ........ 455/436
6,678,523 B1 *  1/2004 Ghosh et al. ............ 455/442
6,804,253 B2 * 10/2004 Western ................. 370/465
6,823,005 B1 * 11/2004 Chuang et al. .......... 375/227

(Continued)

OTHER PUBLICATIONS

Gutierrez et. al., Performance of Link Adaptation in GPRS Networks, IEEE VTC 2000.*
Murota, K. and Hirade, K., "GMSK Modulation for Digital Mobile Radio Telephony," *IEEE Transactions on Communications*, vol. COM-29, pp. 1044-1050, Jul. 1981.

(Continued)

*Primary Examiner*—Mohammad H Ghayour
*Assistant Examiner*—Sophia Vlahos

(57) ABSTRACT

In one embodiment of the method of adaptively selecting an airlink coding scheme in a telecommunications network, a coding scheme operating region is determined based on a currently used coding scheme and measurements representative of a block error rate. A block error coding scheme is determined based on the determined coding scheme operating region. In another embodiment of the method of adaptively selecting an airlink coding scheme in a telecommunications network, a first coding scheme is determined based on measurements representative of one or more conditional channel quality metrics, and a second coding scheme is determined based on measurements representative of a block error rate. One of the first and second coding schemes is selected as the coding scheme.

37 Claims, 4 Drawing Sheets

U.S. PATENT DOCUMENTS

| | | | |
|---|---|---|---|
| 6,865,233 B1* | 3/2005 | Eriksson et al. | 375/261 |
| 7,016,670 B2* | 3/2006 | Agin | 455/423 |
| 7,027,420 B2* | 4/2006 | Hamalainen | 370/335 |
| 2002/0068560 A1* | 6/2002 | Agin | 455/423 |
| 2004/0081248 A1* | 4/2004 | Parolari | 375/259 |
| 2004/0218567 A1* | 11/2004 | Budka et al. | 370/332 |
| 2005/0007968 A1* | 1/2005 | Hsu et al. | 370/310 |

OTHER PUBLICATIONS

Nanda, S., Balachandran, K. and Kumar, S., "Adaptation Techniques in Wireless Packet Data Services," *IEEE Communications Magazine*, pp. 54-64, Jan. 2000.

www.3GPP.org.

* cited by examiner

LINK ADAPTION IN GENERAL PACKET RADIO SERVICE NETWORKS

BACKGROUND OF THE INVENTION

1. Field of the Invention

The present invention relates to General Packet Radio Service Networks; and more particularly, link adaptation in such networks.

2. Description of Related Art

To exploit the wide range of carrier-to-interference (C/I) ratios experienced over the radio interface, General Packet Radio Service (GPRS) networks employ four different airlink coding schemes. An airlink coding scheme is an error correction code that generates a total of n encoded bits for each k information bits, and therefore, has a coding rate $$\frac{k}{n}.$$

CS-1 is GPRS's lowest rate code. CS-4 is GPRS's highest rate code. In the set containing codes {CS-1, CS-2, CS-3}, CS-3 is the highest rate code, CS-1 is the lowest rate code.

One coding scheme is stronger than another if it is capable of correcting more channel errors per block. CS-1 is stronger than CS-2, CS-3 and CS-4. Similarly, CS-2 is weaker than CS-1, since CS-2 is capable of correcting fewer channel errors than CS-1.

GPRS's lowest rate code, CS-1, employs a relatively high number of redundancy bits and offers a maximum logical link control (LLC)-layer throughput of 8 kbps/timeslot. The high level of redundancy present in blocks encoded using CS-1 ensures that mobile stations at the fringes of a cell, where C/I levels are typically lowest, are able to send and receive data. In contrast, the highest rate code, CS-4, offers maximum LLC-layer throughputs of 20 kbps/timeslot. Because of the small number of redundancy bits added to each block encoded with CS-4, however, airlink errors can be detected, but not corrected. As a result, CS-4 offers the best airlink performance at relatively high C/I ratios. The remaining two GPRS coding schemes offer maximum LLC-layer throughputs of 12 kbps/timeslot (CS-2) and 14.4 kbps/timeslot (CS-3).

By monitoring the quality of the airlink, the GPRS network can select the coding scheme that offers the best performance. The process of dynamically selecting the coding scheme based on airlink quality is called link adaptation.

A link adaptation algorithm, for example, may wish to select the coding scheme that maximizes link layer throughput, subject to block error rates falling below a desired maximum target (~20%). Such a performance measure strikes a balance between the goal of airlink efficiency (high throughputs) with the goal of keeping delay variance tolerable (low block error rates).

However, link adaptation decisions based on maximizing throughput alone neglects the debilitating effects high block error rates have on higher layer protocols. High block error rates can cause a block to be retransmitted several times before it is correctly received. Highly variable delay in the transmission of radio link control (RLC) blocks can cause RLC flow control windows to stall, throttling the rate at which data can be delivered between the GPRS network and a mobile. Variable delays also wreak havoc on connection-oriented protocols such as TCP, triggering retransmissions which waste airlink resources. High delay variance is also annoying to end users.

SUMMARY OF THE INVENTION

In the link adaptation methodology according to one embodiment of the present invention, a coding scheme is determined based on measurements indicative of block error rate. Specifically, a coding scheme operating region is determined based on the measurements, and coding scheme corresponding to the determined coding scheme operation region is selected. To determine the coding scheme operation region, one embodiment of the present invention estimates a block error rate for a predetermined one of the coding schemes in each coding scheme operating region based on the measurement. Based on a comparison of the estimated block error rates to expected block error rates for the predetermined coding scheme in each coding scheme area, the coding scheme operating region is determined. In another embodiment, region indicators for each coding scheme operating region are generated based on the measurements, and the coding scheme is determined based on the generated region indicators.

According to a further link adaptation methodology of the present invention, a coding scheme is selected from a coding scheme determined based on measurements indicative of block error rate and a coding scheme determined from one or more conditional channel quality metrics such as bit error rate. In one embodiment the strongest coding scheme between the two coding schemes is selected. In another embodiment, the coding scheme selected is based on the block error rate. A low block error rate indicates, for example, that a bit error rate based coding scheme is appropriate, while a high block error rate indicates that the bit error rate coding scheme is not necessarily appropriate.

As a result of the link adaptation methodologies according to the present invention, link adaptation decisions do not neglect the debilitating effects high block error rates have on higher layer protocols.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein.

DETAILED DESCRIPTION OF EMBODIMENTS

Figure 1:
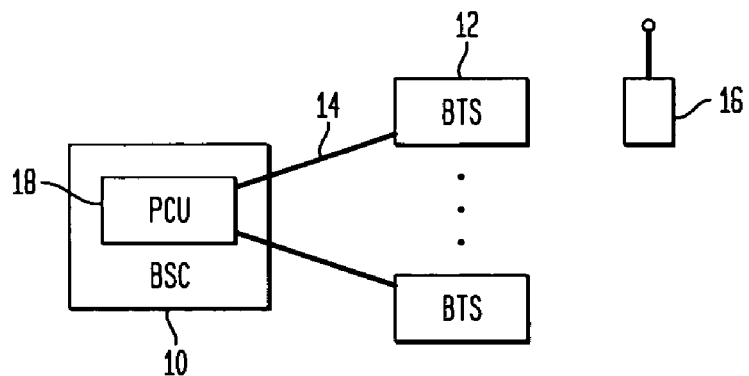
FIG. 1 illustrates an example of a portion of a General Packet Radio Service (GPRS) network.

FIG. 1 illustrates an example of a portion of a General Packet Radio Service (GPRS) network. As shown, a base station controller (BSC) 10 communicates with one or more base transceiver stations (BTS) 12 over A-bis interface 14. The BTSs 12 communicate in a wireless fashion with mobile stations, such as mobile station 16, in their respective cells (not shown for the purposes of clarity).

The BSC 10 includes a packet control unit (PCU) 18 that prepares control and information data for transmission by the BTSs 12 to mobile stations according to the well-known GPRS RLC protocol. The PCU 18 also processes data received from the mobile stations via the base transceiver stations 12 according to the GPRS RLC protocol. More specifically, the PCU 18 performs the link adaptation methodology of the present invention. This involves selecting the downlink coding scheme based on channel quality measurements received from the mobile station 16, and selecting an uplink coding scheme, which is sent as control information to the mobile station, based on channel quality measurements by the BTS 12.

To support link adaptation, RLC/MAC layer of GPRS provides mechanisms for mobile stations to report downlink quality measurements. Downlink channel quality reports provide the GPRS network with information it needs to select appropriate coding schemes to use in the downlink for each mobile station, and to revise the decision as channel quality changes. The RLC/MAC layer also provides mechanisms for the network to command each mobile to use specific coding schemes for uplink transmissions.

Downlink Link Adaptation

During packet transfer mode, the mobile station assesses downlink channel quality. Table 1 summarizes the channel quality measurements reported by the mobile station in messages such as the Packet Downlink ACK/NACK message.

TABLE 1

Summary of downlink quality measurements reported by Mobile Stations.

| Reported Value | Description |
|---|---|
| C_VALUE | 6-bit long binary encoding of "C", the estimated normalized received signal level of the broadcast control channel (BCCH). The range is [−110, −48] dBm. |
| RXQUAL_i ($i = 0, \ldots, 7$) | When CS-1, CS-2, or CS-3 are used on the downlink, mobile stations report one of eight possible values specifying the estimated bit error rate (BER) of the downlink channel. The BER estimate is calculated over successfully decoded blocks received during the measurement interval.<br>RXQUAL_0 = BER < 0.2%<br>RXQUAL_i = $(0.1*2^i)\% < \text{BER} < (0.1*2^{i+1})\%$<br>($i = 1, \ldots, 6$)<br>RXQUAL_7 = 12.8% < BER<br>When CS-4 is used on the downlink, mobile stations are permitted to report RX_QUAL = 7, regardless of the quality of the channel. |
| SIGN_VAR | Estimated variance of the received signal strength calculated over correctly decoded blocks. The measured signal variance is reported as a 6 bit binary value. If $(\text{SIQN\_VAR})_{10}$ denotes the decimal value of the 6 bit number, reported SIGN_VAR levels have the following meaning:<br>$(\text{SIGN\_VAR})_{10} = 0$   0 dB² to 0.25 dB²<br>$(\text{SIGN\_VAR})_{10} = i$   [0.25*i]dB² to [0.25*(i + 1)]dB²<br>($i = 1, \ldots, 62$)<br>$(\text{SIGN\_VAR})_{10} = 63$   >15.755 dB² |

TABLE 1-continued

Summary of downlink quality measurements reported by Mobile Stations.

| Reported Value | Description |
|---|---|
| I_LEVEL_TNi ($I = 0, \ldots, 7$) | Estimated received downlink interference power on timeslot i, measured over search and PTCCH frames. The measured interference level is reported as a four bit binary value (0000→I_LEVEL 0, . . . , 1111→I_LEVEL 15). Reported I_LEVELs on each timeslot have the following meaning:<br>I_LEVEL 0 interference level is greater than C<br>I_LEVEL i C − (i + 1)*2 dB < interference level ≦ C − i*2 dB ($I = 1, \ldots, 14$)<br>I_LEVEL 15 interference level ≦ C − 30 dB |

The measurements reported by mobile stations can be used to assess the quality of the downlink channel:

C_VALUE: The C_VALUE reported by the mobile station can be used to assess the mean attenuation of the downlink signal received by a mobile station. BCCH_LEVEL-C_VALUE is the average path-loss (in dBm) of the downlink channel. C_VALUE is used as a criterion in base station selection and handover.

RX_QUAL: When CS-1, CS-2 or CS-3 are used, RX_QUAL is the mobile station's estimate of the mean bit error rate of the downlink channel since the last channel quality report was sent. A mobile station's bit error rate estimates are constructed by averaging the number of bit errors observed in correctly decoded blocks addressed to it. Hence, RX_QUAL is a biased estimator of the actual downlink bit error rate. BER is fairly insensitive to channel propagation effects. RX_QUAL is a good indicator of which coding scheme should be used when block error rates are low.

When CS-4 is used on the downlink, a mobile station is allowed to report RX_QUAL-7, regardless of the bit error rate of the channel As a result, RX_QUAL will not be a meaningful measure of link quality when CS-4 is used.

SIGN_VAR: SIGN_VAR measures the variance in received signal strength over the four bursts comprising a radio block. High values of SIGN_VAR are indicative of high mobile station speeds, while low values of SIGN_VAR are indicative of slowly moving mobile stations. Frequency hopping is likely to result in higher values of SIGN_VAR when compared to the case when frequency hopping is not present. Rayleigh fading causes variation in the signal strength levels over the four bursts comprising a single block. At low mobile speeds, attenuation levels experienced by each burst are highly correlated. Hence, the variance in received power over successive bursts that comprise a block at low mobile speeds are low. As a result of the correlation in signal strength, bit errors tend to be highly correlated at low mobile station speeds. At higher mobile station speeds, however, the signal levels of the four bursts that comprise a block exhibit high variance. At higher speeds, channel bit errors are not as highly correlated as they are at low speeds.

Under similar mean C/I and shadowing conditions, when frequency hopping is not used, block error rates for CS-1, CS-2 and CS-3 tend to be higher for slower moving mobile stations than they are for faster mobile stations. Hence, SIGN_VAR can provide potentially useful information for link adaptation and power control algorithms.

I_LEVEL_TNi. Mobile stations make interference measurements during two search and two packet timing control channel (PTCCH) frames which occur during each 52-multiframe. These four "measurement opportunities" occur once every 60 ms. A mobile station must perform at least $N_{AVG\_I}$ measurements on a timeslot before it can report valid interference measurements for the timeslot. ($N_{AVG\_I}$ is a tunable system parameter ranging from 1 to 180.) If a valid interference measurement is not available for a timeslot at the time a mobile station sends a channel quality report, no interference measurements are reported for that timeslot.

Uplink Link Adaptation

Uplink blocks received by the a BTS 12 are forwarded to the PCU 18 over the A-bis interface 14. Each uplink block is encapsulated in a PCU frame. The PCU frame's header includes fields that encode the quality of the received block.

BFI If the BTS 12 is unable to correctly decode a block, it can set a Bad Frame Indicator (BFI) bit in the PCU frame to 1. A BFI value of 0 indicates that the BTS was able to correctly decode the block.

RXLEV The BTS 12 indicates the average received power of the four bursts comprising the block. RXLEV can be encoded using a total of six bits as follows:

RXLEV 0=less than −110 dBm
RXLEV 1=−110 dBm to −109 dBm
RXLEV 2=−108 dBm to −107 dBm . . .
RXLEV 62=−49 dBm to −48 dBm
RXLEV 63=greater than −48 dBm RXQUAL For correctly decoded blocks, the BTS can determine the number of bits that were in error in the received radio block. The number of bit errors in each block gives useful information on the quality of the data link.

Each uplink GPRS block contains a total of 456 bits. The BTS calculates the bit error rate (BER) as (number of bits in error)/456*100%. The BER can be encoded using only 3 bits of the PCU frame header. A suitable encoding is as follows:

| RXQUAL value | BER range | Number of bits in error |
|---|---|---|
| RXQUAL 0 | BER < 0.2% | 0 |
| RXQUAL 1 | 0.2% < BER < 0.4% | 1 |
| RXQUAL 2 | 0.4% < BER < 0.8% | 2-3 |
| RXQUAL 3 | 0.8% < BER < 1.6% | 4-7 |
| RXQUAL 4 | 1.6% < BER < 3.2% | 8-14 |
| RXQUAL 5 | 3.2% < BER < 6.4% | 15-29 |
| RXQUAL 6 | 6.4% < BER < 12.8% | 30-58 |
| RXQUAL 7 | BER > 12.8% | 59-456 |

Frame Type
The PCU frame header specifies whether a block was encoded using CS-1, CS-2, CS-3 or CS-4.

Selecting a Code Based on BER

Channel bit error rate (BER) is an excellent predictor of coding scheme block error rates. As such, it is an attractive metric to use for link adaptation. Because of the large number of bits per airlink block (456 bits/block), BER can be measured accurately over a relatively small number of radio blocks (~5). Rapid, accurate channel quality estimation is crucial to properly selecting a coding scheme for use over a time-varying airlink.

The BTS and mobile, however, cannot always accurately estimate the channel bit error rate. Channel bit error rate estimates are inherently biased, since they are obtained by averaging the number of bit errors observed in correctly decoded blocks. When block error rates are relatively low, bit error rates made in this fashion are close to the actual bit error rate. At higher block error rates, the estimate is unreliable, resulting in underestimation of the true bit error rate of the channel.

Figure 2:
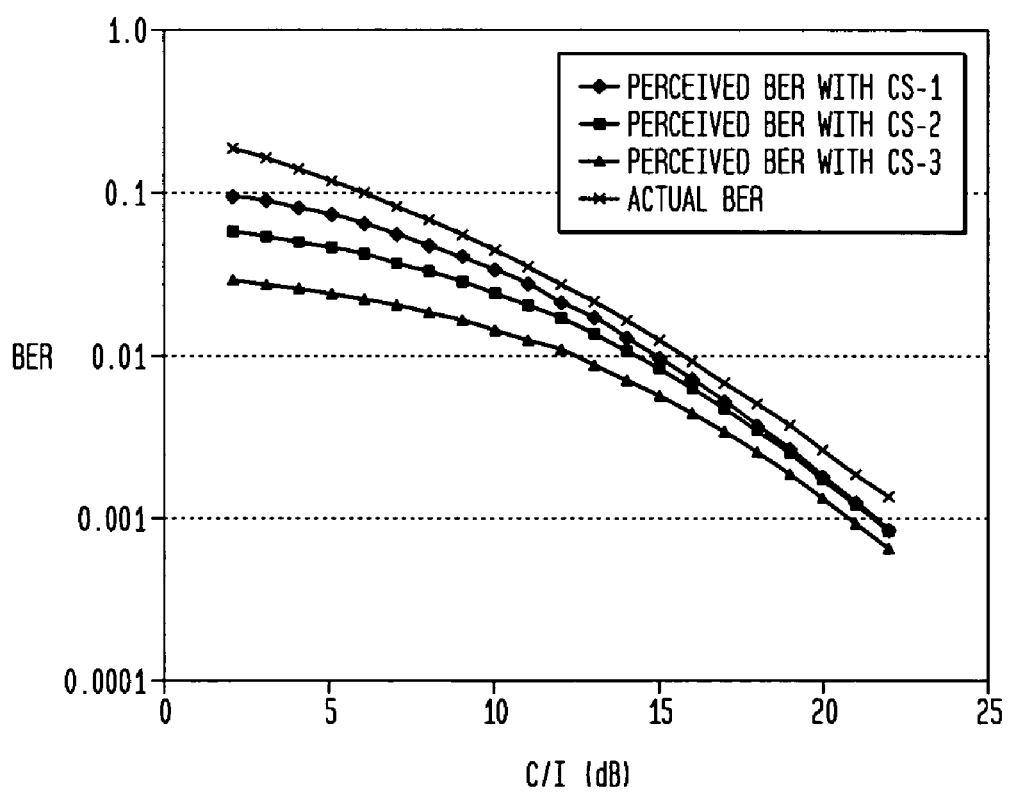
FIG. 2 shows the difference between the perceived mean Bit Error Rate (BER)—the BER estimated by counting the number of bit errors which occur in successfully decoded blocks—and the true channel BER for the propagation model TU3FH.

FIG. 2 shows the difference between the perceived mean BER—the BER estimated by counting the number of bit errors which occur in successfully decoded blocks—and the true channel BER for the propagation model TU3 with frequency hopping. For example, at C/I's of 12 dB or better, the perceived bit error rate curves for CS-1 and CS-2 closely track the actual channel bit error rate. At C/I levels in excess of 12 dB, block error rates are less than 10% for coding schemes CS-1 and CS-2. When block error rates are low, perceived bit error rate estimates (RX_QUAL) give useful information about which coding scheme should be used over the airlink.

Link adaptation based on perceived BER is straightforward: coding schemes are selected using a network-operator tuneable table mapping perceived bit error rate (RX_QUAL) to the maximal rate coding scheme that should be used. A coding scheme selected in this manner will be denoted $CS_{BER}$. When block error rates are high (>10%), however, link adaptation decisions made on the basis of perceived BER will always end up selecting a weaker code than what is actually needed. Also, because RX_QUAL values are unreliable when CS-4 is used over the interface, the approach can not be used when CS-4 is used to encode airlink blocks.

Selecting a Code Based on Observed Block Errors

A link adaptation algorithm monitors channel quality over an observation interval, during which channel conditions are assumed to be relatively static. Based on what occurs during the observation interval, the link adaptation algorithm decides which coding scheme to use for future blocks.

Figure 3:
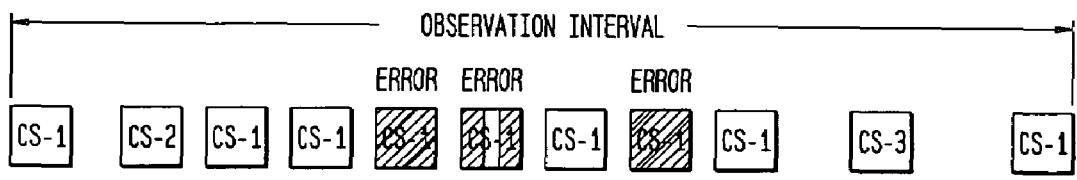
FIG. 3 shows a sample observation interval.

FIG. 3 shows a sample observation interval. Because of retransmissions and changes in coding scheme decisions made over time, the observation interval may contain blocks sent using different coding schemes. Because of the relatively high fraction of block errors during the observation interval and the presence of CS-4 blocks, perceived bit error rate-based link adaptation decisions as described above can be unreliable.

Figure 4:
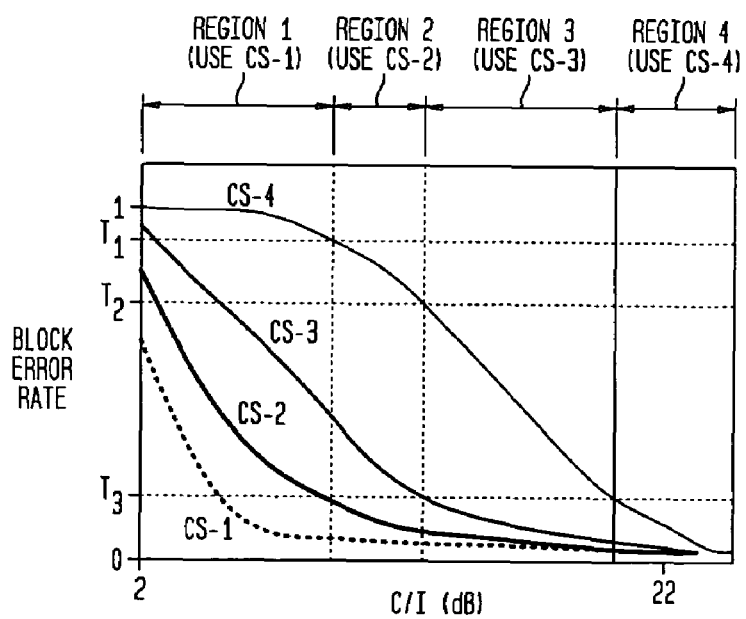
FIG. 4 shows an idealized plot of the block error rates for different coding schemes as a function of C/I for a propagation environment.

FIG. 4 shows an idealized plot of the block error rates for different coding schemes as a function of C/I for a propagation environment.

As shown in FIG. 4, the operational C/I range is divided into four disjoint regions. "Region i" denotes the C/I range in which coding scheme CS-i should be used. Let the block error rate for a CS-4 radio block in region i be denoted $P_i$. Suppose that under the same channel condition in region i the probability that a CS-j RLC block is received in error is or $\alpha_{i,j} P_i$. Assume that the constants $\alpha_{i,j}$ are known and independent of the propagation model. Although this assumption is not entirely accurate, it is only required that $\alpha_{i,j}$ be of the same order in magnitude. This is because in practice it is extremely unlikely to have more than 20 blocks in any given observation interval. As a result, small differences in $\alpha_{i,j}$ will not affect the outcome of our method. Besides, we are not really interested in estimating the true block error rate, but only in deciding which of the 4 coding schemes can be supported under the current channel conditions. This, too, allows the method to be fairly insensitive to the choice of $\alpha_{i,j}$. That $\alpha_{i,j}$ is of the same order in magnitude for various propagation models has been validated through simulation results.

Under the assumption that the probability that a CS-j RLC block is received in error is $\alpha_{i,j} P_i$ and that the channel lies in region i, the value of $P_i$ can be estimated from the observed block errors over an observation interval. To show this, let $N_j$ denote the number of RLC blocks encoded using CS-j, which were received in the current observation interval, and let $e_j$ denote the number of RLC blocks out of $N_j$ which were in error. Accordingly, $e_j/N_j$ represent the block error rate (BLER). The mobile station reports $e_j$ and $N_j$ to the PCU 18 for downlink adaptation purposes and the PCU 18 measures $e_j$ and $N_j$ for uplink adaptation purposes.

Assume that block errors are independent over the observation interval. This assumption is justified provided:

Fluctuations in link quality caused by shadow fading and interference power fluctuations are negligible over the observation interval.

Rayleigh fading does not cause block errors to be correlated. This assumption is valid in systems employing frequency hopping. In systems not employing frequency hopping, however, Rayleigh fading at low mobile speeds will indeed cause block errors to be correlated when blocks are sent to a mobile once every 20 ms. In general, this correlation will cause the selection of a coding scheme to be conservative. And, the block error rate estimation approach disclosed herein will still work well on non-frequency hopped channels.

Under these assumptions, the probability $P_{obs}$ of observing $e_j$ blocks errors when a total of $N_j$ blocks using coding scheme CS-j are sent over the observation interval (j=1, ..., 4) is $$P_{obs} = \prod_j \binom{N_j}{e_j}(\alpha_{i,j}q)^{e_j}(1-\alpha_{i,j}q)^{N_j-e_j}, \quad \text{Equation 1}$$

where q is a variable denoting the (unknown) block error rate (BLER) for CS-4.

The maximum-likelihood estimate $\hat{P}_i$ of $P_i$ given the sequence of block errors appearing in the observation interval is given by $$\hat{P}_i = \max_q \prod_j (\alpha_{i,j}q)^{e_j}(1-\alpha_{i,j}q)^{N_j-e_j} \quad \text{Equation 2}$$

Therefore, $\hat{P}_i$ is given as the solution to the equation $$g_i(q)=0, \quad \text{Equation 3}$$

where taking the log of equation 2 and differentiating gives:

$$g_i(q) = \sum_j \left[\frac{e_j}{q} - \frac{(N_j-e_j)\alpha_{i,j}}{1-\alpha_{i,j}q}\right]. \quad \text{Equation 4}$$

The quantity $P_i$ characterizes the quality of the channel. Hence a set of switching thresholds $T_1, T_2$ and $T_3$ ($1 \geq T_1 > T_2 > T_3 \geq 0$) are defined to determine when different coding schemes may be used:

use CS-1, if $P_i > T_1$,
use CS-2, if $T_2 < P_i \leq T_1$,
use CS-3, if $T_3 < P_i \leq T_2$, and
use CS-4, otherwise.

Alternatively, CS-i should be used only if the true value of $P_i$ is less than some threshold $T_{i-1}$. (It is assumed that $T_0 < 1$.)

Whether the condition $\hat{P}_i < T_i$ is true is easily determined through the following observation. The function $g_i(q)$ defined in Equation 4 is a decreasing function of q. So, it holds that $g_i(\hat{P}_i) > g_i(T_i)$, if $\hat{P}_i < T_i$, and $g_i(\hat{P}_i) \leq g_i(T_i)$ otherwise. \quad Equation 5

Since $g_i(\hat{P}_i)=0$, (see Equation 3), it follows that $g_i(T_i) < 0$, if $\hat{P}_i < T_i$, and $g_i(T_i) \geq 0$, otherwise. \quad Equation 6

Hence, the sequence of block errors in the measurement interval show CS-i can be used only if $g_i(T_i) < 0$.

Sequential hypothesis testing can be used to determine $CS_{BLER}$, the maximal rate coding scheme that should be used on the air interface based on the block errors observed during a measurement interval. Pseudo-code for the sequential hypothesis testing algorithm performed by the PCU 18 is shown below:

```
i = 1;
while(g_i(T_i) < 0 AND i < 4){
    i ← i + 1;
}
CS_BLER = i;
```

An alternative formulation of the functions $g_i(\cdot)$ is as follows. Let $B_{i,j}$ denote the block error rate for blocks sent using coding scheme j at the C/I corresponding to threshold $T_i$. That is, $$B_{i,j} = \alpha_{i,j}T_i = \alpha_{i,j}B_{i,4}.$$

Hence, $$g_i(T_i) = \sum_j \left[\frac{e_j}{B_{i,4}} - \frac{(N_j-e_j)B_{i,j}}{(1-B_{i,j})B_{i,4}}\right].$$

The tuneable parameters of the functions $g_i(\cdot)$ as expressed in Equation 7 are a bit more appealing than the in Equation 4: they are the block error rates expected when each of the four coding schemes are used at each of the three switching thresholds. Instead of defining the switching points in terms of the parameters $T_i$ and $\alpha_{i,j}$, the switching thresholds are defined in terms of the block error rates expected to see when switching from one coding scheme to another. Let $BLER_i^{CS-j}$ denote the expected block error rate for CS-j blocks when a switch should be made from coding scheme CS-i to CS-(i+1). The switching threshold can then be expressed in terms of the vector $\overrightarrow{BLER_i} = (BLER_i^{CS-1}, BLER_i^{CS-2}, BLER_i^{CS-3}, BLER_i^{CS-4})$. A total of three such vectors are defined by the network operator: one for the block error expected when switching from CS-1 to CS-2 ($\overrightarrow{BLER_1}$), one for the block errors expected when switching from CS-2 to CS-3 ($\overrightarrow{BLER_2}$), and one for the block error expected when switching from CS-3 to CS-4 ($\overrightarrow{BLER_3}$).

The vectors selected should satisfy the following constraints:

$BLER_i^{CS-j} \leq BLER_i^{CS-(j+1)}$, $\forall i,j$. This constraint characterizes the property that under identical channel conditions, weaker codes have higher block error rates than stronger ones.

$$BLER_i^{CS-j} \geq BLER_{i+1}^{CS-j},$$

$\forall i,j$: This constraint characterizes the property that the block error rate of a coding scheme does not worsen as channel conditions improve.

Initial simulation results show that these vectors can be easily tuned, based on the fact that in the region where coding scheme CS-i should be used, the block error rates for CS-j (j<i) should be nearly 0.

Since the channel quality is time-varying, the observation interval must be fairly short (on the order of one second, or so). As a result, an observation interval will contain on the order of ten blocks or so—far too few blocks to estimate block error rates smaller than 10%. For this reason, coding scheme decisions based on measured block error rates will only be reliable when block error rates are relatively high. When block error rates are low, this scheme may end up selecting a coding scheme that is too weak to use on the channel. In an alternative embodiment, the selection of the coding scheme according to the BLER is conceptually based on more than one coding scheme region map as shown in FIG. 4; wherein the region map used to determine the coding scheme is selected based on the desired quality of service and/or type of service.

Combining the BER-Based and BLER-Based Estimates

Let $CS_{MAX}$ denote the highest rate code that should be used given the airlink quality during the observation interval. The link adaptation algorithm run by the PCU 18 will select $CS_{MAX}$ as follows:

$$CS_{MAX} = \min\{CS_{BLER}, CS_{BER}\}, \quad \text{Equation 8}$$

where the min{CS-x,CS-y} operator denotes the strongest of the two codes CS-x and CS-y. (For example, min{CS-2, CS-4}=CS-2.) Similarly, the max{CS-x, CS-y} operator will be used to denote the weakest of the two codes CS-x and CS-y. (For example, max{CS-2, CS4}=CS-4.) Additionally, instead of $CS_{BER}$, the selection of Equation 8 is between $CS_{BLER}$ and a CS based on any conditional channel quality metric such as BER, a function of the bit-wise soft decision metrics generated by an equalizer, variance in bit error rates, etc. Also, instead of having a look-up table mapping one conditional channel metric to a coding scheme, a look-up table that uses multiple conditional channel metrics as inputs to map to a coding scheme can be used.

As a still further alternative, multiple look-up table can be used; wherein one of the look-up tables is selected based on the desired quality of service, type of service and/or the block error rate.

Selecting a coding scheme in this manner overcomes the deficiencies of $CS_{BER}$ and $CS_{BLER}$:

When block error rates are high, $CS_{BLER}$ gives a reliable estimate of the coding scheme with the best performance, while $CS_{BER}$ will most likely be too weak for the current channel conditions. In this scenario, $CS_{max}$ will be equal to $CS_{BER}$.

When block error rates are low, $CS_{BER}$ gives a reliable estimate of the coding scheme with the best performance while $CS_{BLER}$ will most likely be too weak for the current channel conditions. In this scenario, $CS_{max}$ will be equal to $CS_{BER}$.

Link-Quality Caching

Data transfer for GPRS applications may tend to be "bursty"—several packets sent over a relatively short period of time. For such applications, the period of time between packets may be long enough for a downlink Temporary Block Flow (TBF) to be torn down. TBFs for mobiles running such applications will be short-lived. However, once a TBF is torn down, another will likely be set up again soon after. Path-loss, shadowing, and interference conditions in the wireless environment tend to be highly correlated over short periods of time (on the order of one second). As a result of this high correlation, a downlink TBF with mobile station m beginning a short period of time after its previous downlink TBF on the same timeslot should experience similar airlink quality. This is also true for uplink TBFs. The link adaptation algorithm takes advantage of this correlation.

At the end of a TBF, the algorithm (i.e., the PCU 18) will store the value of the coding scheme currently in use and other channel parameters. The cached values will be used for subsequent TBFs, suitably aged.

The PCU 18 uses the same coding scheme used at the end of the previous TBF (CS-x) provided a subsequent TBF begins within $T_{cache}$ time units. Starting the TBF with the coding scheme max(CS-(x-1), CS-1) when the elapsed time falls between $T_{cache}$ and $2T_{cache}$, and so on.

The separate cached information will be maintained for the downlink and the uplink for the same mobile.

Aging Coding Schemes

The time intervals between blocks transferred to/from a mobile can be long. For example, if the mobile has low-priority, or if the timeslot is heavily loaded, then it is very likely that a significant amount of time will have elapsed since the last channel quality report was received from the mobile. In such cases, it is possible that the airlink quality being experienced by the mobile has changed significantly due to variations in interference, path loss and shadow fading. A higher BLER could be experienced as time passes, making it dangerous to use the same coding scheme for long periods of time without frequent updates of channel quality. This problem is certainly a bigger concern for weak coding schemes like CS-4.

Figure 5:
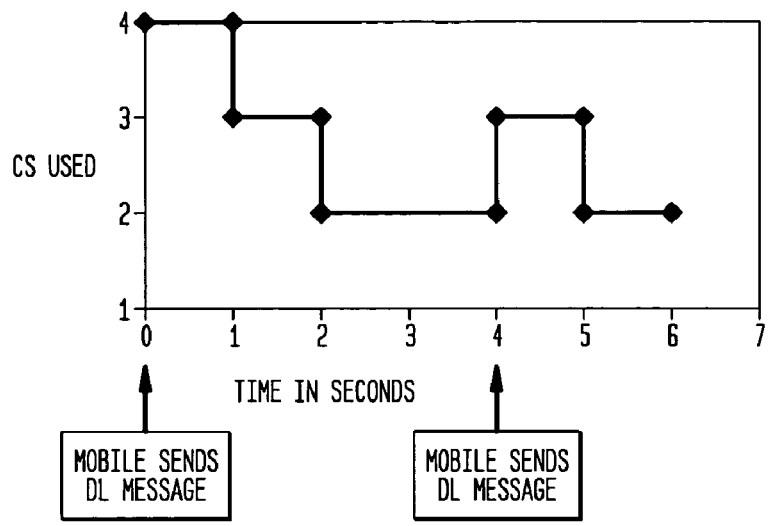
FIG. 5 shows the Coding Scheme (CS) that will be used as a result of an aging procedure according to the present invention.

In order to address this concern, a tuneable parameter $CS_{age}$ is defined, and it is assumed that all coding schemes weaker than $CS_{age}$ are subject to this problem. Let $CS_{DL}$ denote the coding scheme selected at the time of the last coding scheme update. If $CS_{DL} > CS_{age}$, then the PCU 18 ages $CS_{DLADV}$ at a rate determined by the tuneable parameter $T_{age}$. This aging procedure continues until the aged CS equals $CS_{age}$. The following example illustrates this mechanism. Assume that $CS_{age}=2$, and $T_{age}=1$ second (the units for the parameter $T_{age}$ is frames; however, for the purposes of illustration only, the units of $T_{age}$ have been shown as seconds). FIG. 5 shows the CS that will be used as a result of this aging procedure.

In FIG. 5, the mobile sends a downlink packet containing a channel quality report, at time 0. Based on this report, the link adaptation algorithm determines $CS_{DL}=4$. Suppose that due to heavy loading, downlink RLC blocks are scheduled for the mobile very infrequently. As a result of the caching procedure if an RLC block is sent in the time interval [0, 1.0), then CS-4 will be used. After that time, $CS_{DL}$ will be aged; thus, CS-3 will be used in the interval [1.0, 2.0). The CS will be aged further after 2.0 seconds, and CS-2 will be used after that.

Since $CS_{age} = 2$, the CS will not be aged any further, and CS-2 will continue to be used until the link adaptation algorithm updates $CS_{DL}$. The next channel quality report is received at time =4. The link adaptation algorithm recommends the use of CS-3. So, CS-3 will be used for the next 1 second, after which CS-2 will be used (because of the aging procedure). This process continues for the duration of the TBF.

The aging procedure allows the link adaptation algorithm to operate independently of scheduling algorithms. This is beneficial, since such independency makes it easier to design and implement the link adaptation algorithm.

CS-4 Must be Used with Caution

GPRS's RLC/MAC layer has a subtle design flaw that affects its ability to cope with time-varying channels. GPRS's RLC/MAC layer selects a coding scheme to send the initial transmission of an RLC/MAC block. If the block is received in error, GPRS's RLC/MAC protocol specifies that the block must be retransmitted using the coding scheme that was used for the initial transmission. The performance of this protocol can suffer severe degradation when used over time-varying channels. Consider, for example, a scenario in which channel conditions are adequate for CS-4 to be employed. CS-4 only offers acceptable performance at high C/I's, since errors occurring in CS-4 blocks can be detected, but not corrected. Suppose sudden degradation in channel quality caused by a change in interference level or attenuation causes the BLER experienced by CS-4 blocks to increase from a few percent to 60%. All blocks received in error must be retransmitted using CS-4, although the block error rate is too high to support the coding scheme. At best, as a result of the sudden drop in airlink quality, data transmissions will suffer excessive delays. At worst, the TBF will break after numerous re-transmissions squander airlink bandwidth.

Accordingly, the PCU 18 follows a set of constraints governing the use of CS-4. Uplink and downlink TBFs are never allowed to begin with CS-4. Furthermore, CS-4 is only used after a period of time has passed when the PCU 18 was able to observe suitable performance when using CS-3. For downlink TBFs, the PCU 18 additionally requires the received signal strength reported by the mobile (C_VALUE) and signal variance (SIGNVAR) fall within suitable ranges set by the system designer. Similarly, for uplink TBFs, the mean signal strength for blocks sent by a mobile (RXLEV) must also exceed a minimum target before an uplink TBF is commanded to use CS-4.

Selecting a Code Based on Volume of Data

A strong case can be made for considering the amount of data to be carried in the TBF when the amount of data (or amount of remaining data) to be transmitted is small. Consider, for example, the transmission of a LLC frame carrying a compressed TCP/IP acknowledgement message. Such frames will be only 10-15 bytes long, and will require only one airlink block, regardless of which of the four GPRS coding schemes is used. For such small transmissions, it the PCU 18 uses the most robust coding scheme possible.

Since many of the frames carried are likely to be small, this scheme can potentially provide a big benefit.

Coping with A-bis Bandwidth Limitations

Because of bandwidth limitations for the A-bis interface 14, not all coding schemes can be used on all timeslots allocated to a mobile station's TBF. The PCU 18 conservatively ensures that the coding scheme commanded by the link adaptation algorithm for a mobile is no weaker than the weakest coding scheme supported by all timeslots currently allocated to it.

For example, if a multislot mobile is allocated one or more timeslots with 16 kpbs A-bis links (only CS-1 and CS-2 are supported on these timeslots) and one or more timeslots with 32 kbps A-bis link (CS-1 through CS-4 are supported), the link adaptation algorithm will not select a coding scheme weaker than CS-2, i.e., only CS-1 and CS-2 may be used by this mobile.

QuickACK

The uplink link adaptation algorithm will also employ a feature term "QuickACK". At the start of an uplink TBF, the network (e.g., PCU 18) must choose an initial coding for each mobile to use. Throughout the lifetime of the uplink TBF, the PCU 18 will periodically send "Packet Uplink ACK/NACK" blocks to the mobile containing updated channel coding commands. It is likely that the mobile station will send a packet uplink Ack/essage each time a tuneable number of radio blocks has been received, $N_{poll}$. (A typical value of $N_{poll}$ is ~10 radio blocks for GPRS.) At the start of an uplink TBF, it is possible for the network to select a coding scheme that is too weak to support the desired uplink channel performance—e.g, one that gives exceptionally high block error rates. Oftentimes, such "poor decisions" can be detected within the first few radio blocks sent on the uplink TBF. Rather than wait for the first $N_{poll}$ blocks to be received to send a packet uplink ACK/NACK message with a new channel coding command, it is best to send the ACK/NACK message sooner.

One (bad) way to do this is to make the first polling interval smaller than $N_{poll}$. This approach can generate significant messaging overhead, particularly for TBFs carrying less than $N_{poll}$ radio blocks. The probability that the correct coding scheme is chosen by the link adaptation algorithm for the mobile at the start of an uplink TBF should normally be quite high. To prevent squandering downlink resources, the uplink link adaptation should first determine if it is necessary to correct the coding scheme being used by the mobile within the first few blocks. If it is not necessary, then the algorithm recommends to the mobile station that the initial "quick" ACK/NACK should not be sent. In such a case, the mobile station schedules the next Uplink ACK/NACK at the usual time, i.e., after the first $N_{POLL}$ blocks have been received from the mobile. This judicious sending of packet uplink ACK/NACK messages at the start of a TBF is called a "QuickACK."

A High-Level Architecture for GPRS Link Adaptation

Figure 6:
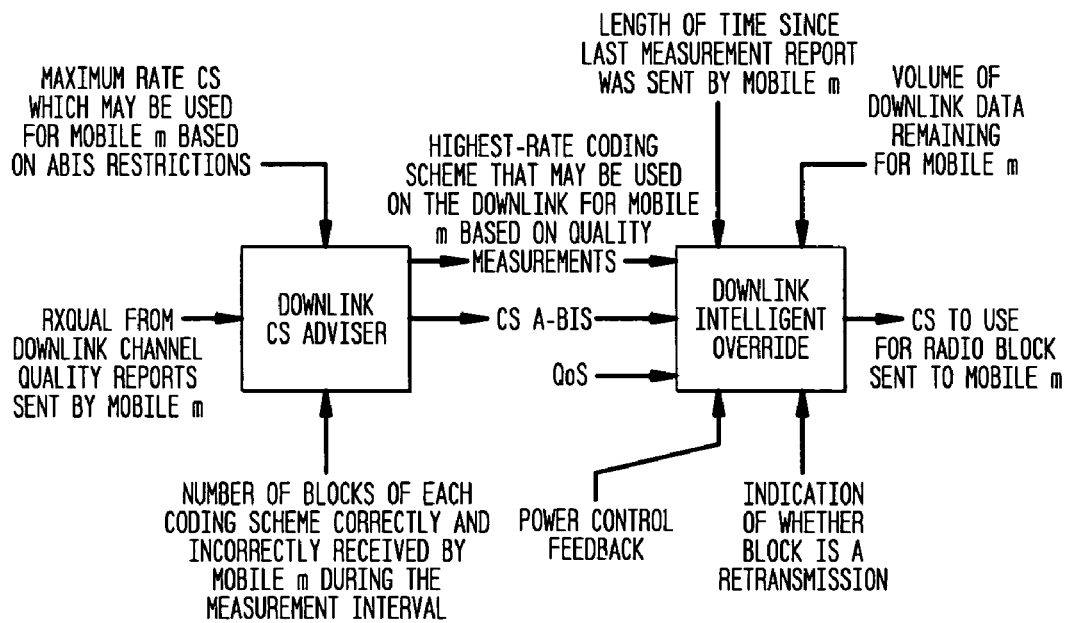
FIG. 6 shows a high-level architecture for a downlink link adaptation feature.
Figure 7:
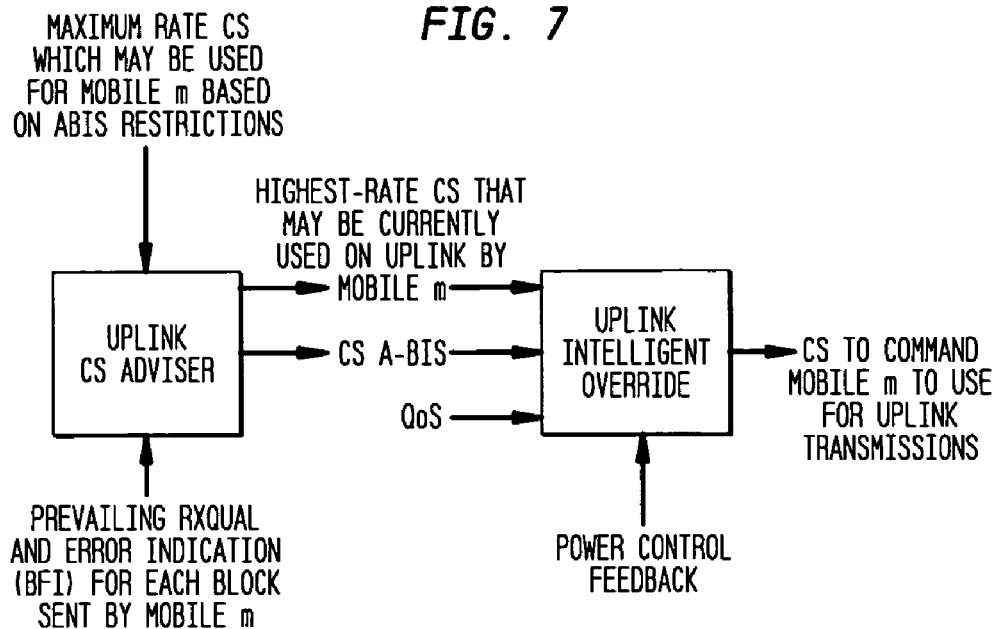
FIG. 7 shows a high-level architecture for an uplink link adaptation feature.

To make development and testing go as smoothly as possible over the lifetime of link adaptation and scheduling features, it is desirable to phase in additional complexity as and when needed. FIGS. 6 and 7 illustrate high-level architecture for GPRS link adaptation that de-couples the selection of a coding scheme based on current link quality, and the need to use a stronger code based on A-bis restrictions and remaining data backlog.

FIG. 6 shows a high-level architecture for the downlink link adaptation feature. The high-level architecture separates downlink link adaptation decisions for each mobile with an active downlink TBF into two functional blocks at the PCU 18: a downlink CS advisor 40 and a downlink intelligent override 42.

The downlink CS adviser 40 monitors the quality of a mobile station's Temporary Block Flow over the TBF's lifetime based on mobile-reported RXQUAL and block errors. When downlink TBFs begin for a mobile, the downlink CS adviser 40 looks to see whether there is information on channel quality from a previous downlink TBF with the mobile that could be used to help determine an initial coding scheme.

The downlink CS adviser 40 determines the coding scheme that should be used by selecting the strongest of $CS_{BER}$ and $CS_{BLER}$, independent of A-bis bandwidth limitations or other constraints.

Although it does not take A-bis bandwidth limitations into account for determining the strongest coding scheme to use, it does evaluate the maximum rate coding scheme that can be currently used by the mobile based on A-bis bandwidth limitations. When quality of service (QoS) scheduling is supported, the downlink CS adviser 40 also provide estimates of airlink performance (throughput) under the current prevailing channel conditions.)

The downlink intelligent override 42 includes logic to determine whether it is advantageous (or necessary, because of A-bis limitations) to use a stronger code than the one suggested by the downlink CS adviser 40. Namely, the downlink intelligent override 42 contains logic to look at the amount of remaining data and determine whether a stronger code than the one suggested by the downlink CS adviser 40 in the same number of downlink radio blocks, logic to only use a CS that can be supported by the A-bis capacity currently allocated to timeslots carrying the mobile's TB logic to support coding scheme aging and coupling between closed-loop power control and link adaptation (discuss in detail below), and logic to support changing the coding scheme based on the desired quality of service (QoS).

The downlink CS adviser 40 is invoked when a downlink TBF starts for a mobile, any time downlink channel quality reports are received from the mobile, any time the mobile's downlink TBF is assigned new timeslots, and any time a TBF ends. It provides information on the weakest coding scheme that can be used successfully for downlink transmissions.

The downlink intelligent override 42 is invoked each time a downlink radio block is to be sent to a mobile. It determines the CS that should be used to encode the current radio block, as well as which RLC blocks should be packed into the radio block.

A High-Level Architecture for Uplink Link Adaptation

FIG. 7 shows a high-level architecture for the uplink link adaptation feature. As in the architecture of the downlink link adaptation algorithm, the uplink link adaptation feature is divided into two functional blocks at the PCU 18: an uplink CS advisor 50 and an uplink intelligent override 52.

The uplink CS adviser 50 tracks the quality of a mobile station's uplink Temporary Block Flow over the TBF's lifetime based on RXQUAL and Bad Frame Indicator values included in each PCU frame corresponding to an uplink radio block allocated to mobile. When uplink TBFs begin for a mobile, it looks to see whether there is information on channel quality from a previous uplink TBF that could be used to help determine an initial coding scheme. The uplink CS adviser 50 determines the coding scheme that should be used by selecting the strongest of $CS_{BER}$ and $CS_{BLER}$. The uplink CS adviser 50 also provide additional information needed for QoS scheduling algorithms.

The uplink intelligent override 52 includes logic to require that only those coding schemes that can be supported by the A-bis capacity currently allocated to timeslots carrying the mobile's TBF, logic to support coupling between closed-loop power control and link adaptation, and logic to support changing the coding scheme based on the desired quality of service.

The uplink CS adviser 50 is invoked when a uplink TBF starts for a mobile, any time a PCU frame corresponding to an uplink block allocated to the mobile is received by the PCU 18, any time the mobile's uplink TBF is assigned new timeslots, and when the mobile's uplink TBF ends. The uplink CS adviser 50 provides information on the weakest coding scheme that can be used successfully for uplink transmissions to the mobile for the service being provided over the TBF.

The uplink intelligent override 52 operates any time a channel coding command is sent to the mobile—any time the mobile station sends a Packet Uplink ACK/NACK or Packet Uplink Assignment message to the mobile.

Coupling Link Adaptation and Power Control

A GPRS network has two tools to combat high airlink block error rates:

Power: The network can increase transmit power, provided the mobile or network are not already transmitting at maximum power levels.

Code rate: The network can select a coding scheme with a lower code rate, provided CS-1 is not currently being used over the airlink.

Link adaptation and power control algorithms are necessarily based on a common assumption: channel conditions caused by path loss, shadow fading and interference in the near future will be similar to those observed in the recent past. If sufficient care is not taken, however, power control and link adaptation algorithms can work against one another. Consider, for example, the painful consequences of a decision by a link adaptation algorithm to jump from CS-1 to CS-3 without taking into account the effects of a simultaneous 10 dB drop in transmit power commanded by a power control algorithm.

Power control algorithms adjust power in attempt to maintain channel quality within a desired quality range. For example, when bit error rates are lower than the target bit error rate range and the mobile is not already using minimum transmit power, the uplink power control algorithm will decrease the mobile's transmit power. When bit error rates are higher than the target bit error rate range and the mobile is not already using maximum uplink transmission power, the uplink power control algorithm will command the mobile to increase transmit power.

Figure 8:
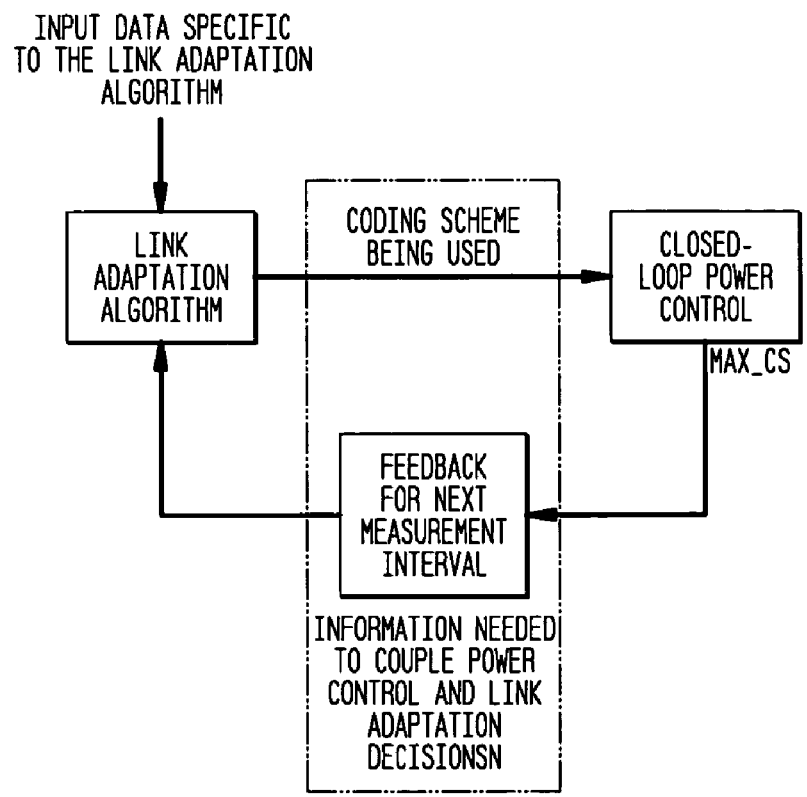
FIG. 8 illustrates the loose coupling between closed-loop power control and link adaptation according to the present invention.

FIG. 8 illustrates the loose coupling between closed-loop power control and link adaptation according to the invention. As shown, the link adaptation algorithm informs the power control algorithm about the weakest coding scheme which may be used over the airlink in the next measurement interval. The power control algorithm then selects the target bit error rate, or equivalently, the target C/I, accordingly. Next, the power control algorithm sets the variable MAX_CS, which indicates the maximum coding scheme that the link adaptation algorithm should use in the next measurement interval so that the interference caused to neighbor cells is tolerable. This variable depends on the level of attenuation being used by the mobile. In general, the higher the level of attenuation, the larger the value of MAX_CS. Intuitively, if the level of attenuation is high, i.e., the transmit power level is low, then the interference being caused to neighbor cells is also low. At such times, the link adaptation algorithm should be allowed to take advantage of coding schemes that require high C/I and yield high throughput if the prevalent channel conditions permit its usage. If on the other hand, the transmit power is high, then the interference being caused is also high. So, the link adaptation algorithm should be restricted to using coding schemes which require low C/I; this, in turn, would allow the possibility of reducing the transmit power level, thereby reducing interference.

If pure open-loop uplink power control is applied, or if constant transmit power is used on the air interface, the link adaptation algorithm is allowed to use all four GPRS coding schemes.

The invention being thus described, it will be obvious that the same may be varied in many ways. Such variations are not to be regarded as a departure from the spirit and scope of the invention, and all such modifications are intended to be included within the scope of the following claims.

We claim:

1. A method of adaptively selecting an airlink coding scheme in a telecommunications network, comprising:

determining a coding scheme operating region based on a currently used coding scheme and measurements representative of a block error rate;

selecting a coding scheme based on the determined coding scheme operating region;

caching, at an end of a first link communication flow with a mobile station, the selected coding scheme; and retrieving the cached coding scheme when a second link communication flow is being established with the mobile station, the retrieved coding scheme being changed to a stronger coding scheme based on an amount of time between the end of the first link communication flow and the beginning of the second link communication flow.

2. The method of claim 1, wherein each of the coding scheme operation regions are predefined operating regions.

3. The method of claim 1, wherein
  each coding scheme corresponds to a different coding scheme operating region; and
  the selecting step selects the coding scheme corresponding to the determined coding scheme operating region.

4. The method of claim 1, wherein the determining step comprises:
  estimating a block error rate for one of the coding schemes in each coding scheme operating region based on the measurements of the block error rate;
  comparing the estimated block error rate to expected block error rates for the one of the coding schemes in each coding scheme operating region; and
  determining the coding scheme operating region based on results of the comparing step.

5. The method of claim 1, wherein the determining step comprises:
  receiving the measurements from a mobile station;
  generating a region indicator for each coding scheme operating region based on the measurements; and
  determining a coding scheme operating region based on the generated region indicators.

6. The method of claim 5, wherein the measurements include a report of correctly and incorrectly received blocks of data.

7. The method of claim 5, wherein the determining step further comprises:
  calculating a number of block errors for a number of blocks sent using the current coding scheme based on the measurements of the block error rate; and wherein
  the generating step generates the region indicators based on results of the calculating step.

8. The method of claim 1, wherein the determining step comprises:
  making the measurements of the block error rate on a signal received from a mobile station;
  generating a region indicator for each coding scheme operating region based on the measurements of the block error rate; and
  determining a coding scheme operating region based on the generated region indicators.

9. The method of claim 8, wherein the measurements include a report of correctly and incorrectly received blocks of data and a measure of a number of bit errors observed in correctly received blocks.

10. The method of claim 1, wherein the determining step determines the coding scheme operating region based on the measurements, which are indicative of a probability that a number of block errors occurred for a number of blocks sent using the current coding scheme.

11. The method of claim 1, further comprising:
  selecting a set of coding scheme operating regions from multiple sets of coding scheme operating regions based on one of quality of service and type of service.

12. The method of claim 1, further comprising:
  determining a bit error coding scheme based on a bit error rate determined from measurements representative of a bit error; and
  selecting one of the bit error coding scheme and the block error coding scheme as the coding scheme.

13. The method of claim 12, wherein the selecting step selects the strongest one of the bit error coding scheme and the block error coding depending on the block error rate as the coding scheme.

14. The method of claim 12, wherein the determining a bit error coding scheme step reads the bit error coding scheme from a look-up table based on the measurements.

15. The method of claim 12, wherein the determining step comprises:
  estimating a block error rate for a predetermined one of the coding schemes in each coding scheme operating region based on the measurements representative of a bit error;
  comparing the estimated block error rate to expected block error rates for the predetermined coding scheme in each coding scheme operating region; and
  determining the coding scheme operating region based on results of the comparing step.

16. The method of claim 12, wherein the determining step comprises:
  generating a region indicator for each coding scheme operating region based on the measurements representative of a bit error; and
  determining a coding scheme operating region based on the generated region indicators.

17. The method of claim 1, further comprising:
  changing the selected coding scheme to a first stronger coding scheme when predetermined criteria regarding performance at a second stronger coding scheme have not been met, the first and second stronger coding schemes being one of same and different coding schemes.

18. The method of clam 1, further comprising:
  changing the selected coding scheme to a strongest coding scheme if an amount of data to be transmitted using the selected coding scheme is less than a threshold amount.

19. The method of claim 1, further comprising:
  changing the selected coding scheme to a coding scheme supported by a transmission time slot when the time slot to be used in transmitting data according to the selected coding scheme does not support the selected coding scheme.

20. The method of claim 1, further comprising:
  performing the method when performance using the current coding scheme falls below a predetermined performance threshold.

21. The method of claim 1, wherein:
  the first link communication flow is a first downlink communication flow and the second link communication flow is a second downlink communication flow.

22. The method of claim 1, wherein:
the first link communication flow is a first uplink communication flow and the second link communication flow is a second uplink communication flow.

23. The method of claim 1, further comprising:
changing the selected coding scheme based on power control being performed by a power control algorithm.

24. A method of adaptively selecting an airlink coding scheme in a telecommunications network, comprising:
estimating a block error rate for one of the coding schemes in each coding scheme operating region based on measurements representative of block error rate;
comparing the estimated block error rate to expected block error rates for the coding scheme in each coding scheme operating region;
determining a coding scheme based on results of the comparing step;
caching, at an end of a first link communication flow with a mobile station, the determined coding scheme; and
retrieving the cached coding scheme when a second link communication flow is being established with the mobile station, the retrieved coding scheme being changed to a stronger coding scheme based on an amount of time between the end of the first link communication flow and the beginning of the second link communication flow.

25. The method of claim 24, wherein the determining step determines the coding scheme associated with the coding scheme operating region having the estimated block error rate less than the expected block error rate as the determined coding scheme.

26. The method of claim 25, wherein the determining step determines the coding scheme associated with the coding scheme operating region having a smallest difference between estimated and expected block errors and having the estimated block error rate less than the expected block error rate as the determined coding scheme.

27. A method of adaptively selecting an airlink coding scheme in a telecommunications network, comprising:
generating a region indicator for each coding scheme operating region based on measurements representative of block error rate;
determining a coding scheme operating region based on the generated region indicators;
caching, at an end of a first link communication flow with a mobile station, the determined coding scheme; and
retrieving the cached coding scheme when a second link communication flow is being established with the mobile station, the retrieved coding scheme being changed to a stronger coding scheme based on an amount of time between the end of the first link communication flow and the beginning of the second link communication flow.

28. The method of claim 27, wherein the measurements include the measurements include a report of correctly and incorrectly received blocks of data.

29. The method of claim 27, further comprising:
calculating a number of block errors for a number of blocks sent using the current coding scheme based on the measurements; and wherein
the generating step generates the region indicators based on results of the calculating step.

30. The method of claim 27, wherein the region indicators are indicative of a probability that a number of block errors occurred for a number of blocks sent using the current coding scheme.

31. A method of adaptively selecting an airlink coding scheme in a telecommunications network, comprising:
determining a first coding scheme based on measurements representative of one or more conditional channel quality metrics;
determining a second coding scheme based on measurements representative of a block error rate;
selecting one of the first and second coding schemes as the coding scheme;
caching, at an end of a first link communication flow with a mobile station, the selected coding scheme; and
retrieving the cached coding scheme when a second link communication flow is being established with the mobile station, the retrieved coding scheme being changed to a stronger coding scheme based on an amount of time between the end of the first link communication flow and the beginning of the second link communication flow.

32. The method of claim 31, wherein the selecting step selects a stronger one of the first and second coding schemes as the coding scheme.

33. The method of claim 31, wherein the conditional channel quality metric is bit error rate.

34. The method of claim 31, wherein the selecting step selects one of the first and second coding schemes based on a block error rate.

35. An apparatus for adaptively selecting an airlink coding scheme in a telecommunications network, comprising:
an advisor unit determining a coding scheme based on measurements representative of block error rate; and
an override unit selectively changing the determined coding scheme based on at least one of an amount of data to be transmitted, a bandwidth of an interface in the telecommunications network, a time period since the measurements were one of made or received, a power control operation, and a desired quality of service, and selectively changing the determined coding scheme to a coding scheme supported by a transmission time slot when the time slot to be used in transmitting data according to the determined coding scheme does not support the determined coding scheme.

36. A method of adaptively selecting an airlink coding scheme in a telecommunications network, comprising:
determining a coding scheme operating region based on a currently used coding scheme and measurements representative of a block error rate;
selecting a coding scheme based on the determined coding scheme operating region at an advisor unit; and
changing the selected coding scheme to a coding scheme supported by a transmission time slot when the time slot to be used in transmitting data according to the selected coding scheme does not support the selected coding scheme at an override unit.

37. A method of adaptively selecting an airlink coding scheme in a telecommunications network, comprising:
determining a coding scheme operating region based on a currently used coding scheme and measurements representative of a block error rate;
selecting a coding scheme based on the determined coding scheme operating region at an advisor unit; and
changing the selected coding scheme based on power control being performed by a power control algorithm, the determined coding scheme being changed to a coding scheme supported by a transmission time slot when the time slot to be used in transmitting data according to the selected coding scheme does not support the selected coding scheme at an override unit.

* * * * *

UNITED STATES PATENT AND TRADEMARK OFFICE
CERTIFICATE OF CORRECTION

PATENT NO. : 7,577,227 B2  Page 1 of 1
APPLICATION NO. : 10/124298
DATED : August 18, 2009
INVENTOR(S) : Budka et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2160 days.

Signed and Sealed this

Seventh Day of September, 2010

David J. Kappos
*Director of the United States Patent and Trademark Office*